United States Patent [19]

Bradley et al.

[11] Patent Number: 4,716,979

[45] Date of Patent: Jan. 5, 1988

[54] LOAD CELL WITH WELDED COMPONENTS

[75] Inventors: Chester D. Bradley, Darien; Detlef Olzog, Norwalk, both of Conn.

[73] Assignee: The A. H. Emery Company, New Canaan, Conn.

[21] Appl. No.: 728,795

[22] Filed: Apr. 30, 1985

[51] Int. Cl.[4] .................. G01G 5/04; G01G 21/24
[52] U.S. Cl. ............................... 177/208; 177/255
[58] Field of Search .......................... 177/208, 255

[56] References Cited

U.S. PATENT DOCUMENTS

| | | |
|---|---|---|
| 2,561,321 | 7/1951 | Tate . |
| 2,960,113 | 11/1960 | Bradley . |
| 2,960,328 | 11/1960 | Tate . |
| 3,089,518 | 5/1963 | Bradley . |
| 3,089,519 | 5/1963 | Bradley . |
| 3,145,795 | 8/1964 | Tate . |
| 3,178,937 | 4/1965 | Bradley . |
| 3,229,515 | 1/1966 | Emery, III . |
| 3,646,854 | 3/1972 | Bradley et al. . |
| 3,889,529 | 6/1975 | Bradley . |
| 4,055,227 | 10/1977 | Brackett ........................ 177/208 |
| 4,483,404 | 11/1984 | Weihs ........................... 177/255 |

FOREIGN PATENT DOCUMENTS 1252936 10/1967 Fed. Rep. of Germany .
1029349 5/1966 United Kingdom .

Primary Examiner—George H. Miller, Jr.
Attorney, Agent, or Firm—St. Onge Steward Johnston & Reens

[57] ABSTRACT

An improved hydraulic load cell is provided comprising a base, a sealing means, a cylinder comprising a ring member welded to the base and a cylinder tube member welded to the ring member, and a piston comprising a plate welded to a piston member, the piston being positioned inside the cylinder. Also provided is a self-centering column comprising means for tending to recenter the column in response to a lateral displacement.

10 Claims, 3 Drawing Figures

LOAD CELL WITH WELDED COMPONENTS

BACKGROUND OF THE INVENTION (1) Field of the Invention

The present invention relates to an improved hydraulic load cell and a method for making same, and more particularly to a novel structure for a hydraulic load cell that is assembled by welding, thereby substantially eliminating mechanical fasteners. A self-centering column for transmitting the loading force to a load cell piston is also provided.

(2) Description of the Prior Art

Hydraulic load cells, which are generally used to weigh large or heavy loads, are known in the art. For example, U.S. Pat. Nos. 3,178,937 to Bradley; 3,145,795 to Tate; 3,089,519 to Bradley; 3,089,518 to Bradley; and 2,960,328 to Tate all disclose typical hydraulic load cells.

The typical hydraulic load cell consists of a piston adapted to move downwardly in response to a loading force into the interior of a closed cylinder. The piston includes a loading head and body, the loading head for attachment to an object to be weighed. Such downward movement acts upon fluid contained within a pressure chamber sealed by a diaphragm. The chamber communicates with a suitable pressure sensitive indicating device, such as a pressure transducer or a Bourdon tube mechanism, through a pressure transmitting passageway and indicator conduit. The indicating device may be calibrated to read directly in terms of pounds or grams of force or in any other desired unit.

The piston is typically supported axially within the cylinder by an annular stay plate and a bridge ring. Both the stay plate and the bridge ring are interposed between the piston and cylinder walls so that they will offset side thrusts on the piston without materially affecting its axial movement in response to a loading force. The stay plate and the bridge ring merely deflect upon movement of the piston and minimize inaccuracies stemming from off-center loading. They are essentially frictionless.

The cylinder is formed by bolting an open-ended substantially tubular wall element to a flat base with bolts. The bolted arrangement also clamps the diaphragm in place over the pressure chamber. The stay plate is fastened to the upper portion of the piston by a clamp consisting of an annular piston clamping ring bolted to the piston body by piston bolts. At its outer end, the stay plate is similarly clamped to the cylinder wall by an annular cylinder clamping ring and a series of cylinder bolts.

A rolling ball coupling, positioned between the loading head and the piston body, decreases the effect of side loading and reduces off-center loading. The coupling eliminates the moment that would be exerted on the piston by weight loads applied through a non horizontal load plate on the loading head and reduces the torque applied to the piston by a rotating load. The ball coupling also accommodates horizontal motion resulting from expansion and contraction caused by temperature changes of weighted objects resting thereon.

Typically the ball coupling consists of a hardened metal ball interposed between two hardened metal inserts. A rubber doughnut-shaped ring, preferably of neoprene rubber, positions the ball centrally within a cavity in the piston body and also acts as a shock absorber against lateral forces. Because such a ball coupling acting upon flat surfaces would permit lateral movement to occur, horizontal stay bars must be provided for restraining horizontal but permitting vertical motion.

If desired, the opposing surfaces of the metal inserts may be made with a concave surface to aid in centering the ball.

The coupling permits slight pivoting and some axial rotation of the loading head about the ball. The load is therefore still vertically transmitted to the piston body. Also the transmission of torque generated by the axial rotation to the piston body is minimized. The coupling tends to absorb transverse forces because the ball will roll and accommodate the displacement.

It is also known to provide a column having a self-centering tendency, where bearing surfaces on either end of the column are spherical and have geometric centers that lie along the center or longitudinal axis of the column but do not coincide, and the radii of the bearing surfaces are equal but are greater than one-half the length of the column, whereby a restoring force is created when the column is displaced laterally.

A flexible boot, preferably of synthetic rubber or the like, is suitably fastened to the cylinder wall and to the loading head by adjustable clamps to seal the interior of the cell from dirt, moisture, or other contaminants.

SUMMARY OF THE INVENTION

In accordance with the present invention, a hydraulic load cell is provided comprising a base, a sealing means, a cylinder comprising a ring member welded to the base and a cylinder tube member welded to the ring member, and a piston comprising a plate welded to a piston tube member, the piston being positioned inside the cylinder. Also provided is a self-centering column comprising means for tending to recenter the column in response to a lateral displacement.

In a particularly preferred embodiment, the piston comprises a section of cylindrical stainless steel tubing welded to a bottom piston member, the cylinder comprises a section of cylindrical stainless steel tubing welded to a stainless steel ring, and the ring is welded to the stainless steel base. A piston stabilizing means comprising a relatively thin, flexible annular member is welded to both the piston tube and the cylinder tube.

The self-centering column of the present invention, whereby a righting moment is produced in response to a lateral displacement of the column, comprises an elongated member having first and second convex bearing surfaces on either end symmetrical about the longitudinal axis of the elongated member. The two bearing surfaces are spherical and have geometric centers or focii that lie along the longitudinal axis but do not coincide, and radii that are equal, are greater than one-half the length of the column head, and are given by the following expression, where PM is the allowable loading head movement, P is the loading force, PR is the lateral restoring force, and D is the length of the column:

$$R =$$

-continued
$$\left(1 - \cos\frac{360PM}{2\pi D}\right) + \sin\frac{360PM}{2\pi D} \left[\frac{\tan\left(90 - \frac{360PM}{2\pi D}\right) - PR/P}{1 + \frac{PR}{P}\tan\left(90 - \frac{360PM}{2\pi D}\right)}\right] \frac{D/2}{}$$

Also provided is a method of manufacturing the hydraulic load cell of the present invention, whereby a first section of tubing is welded to a plate, a second section of tubing is welded to a ring, an annular member is welded to both sections of tubing, and a base is then welded onto the ring.

The use of welding to assemble the hydraulic load cell of the present invention has numerous advantages over the bolted design of the prior art. First, elimination of the bolts and bolt holes reduces the cost. Also, because bolt holes are not needed therein, the sizes of the cylinder and piston walls are reduced, thereby lowering cost even further. This reduction in wall thickness permits the use of stainless steel or carbon steel for the cylinder and the piston, which materials were too expensive for use with the prior art bolted design. In the prior art, the cell was constructed of cast aluminum, which is less durable and less corrosion resistant than stainless or carbon steel. Also, carbon or stainless steel is stronger and permits the cylinder and piston walls to be thinner.

The welded design of the present invention increases the side loading capability of the bridge ring, because the bridge ring is in contact with steel rather than aluminum. The bridge ring itself has no greater strength; rather, more lateral force can be applied to the bridge ring because it is in contact with steel rather than cast aluminum.

The design of the present invention maximizes the use of stay plate strength. In the old bolted design, the clamping force of the bolts was not equal to stay plate strength. On the tension side, the stay plate tended to tear at the bolt holes. On the compression side of the stay plate, buckling was a problem. However, in the embodiment of the present invention, the strength of the weld holding the piston and cylinder to the stay plate is approximately equal to the stay plate strength.

The new welded design and the method thereof eliminates the castings required for the old cast aluminum design. With the welded design, tubular shapes are purchased and the desired lengths are cut off and welded together. This also reduces costs, in that the amount of machining required is reduced.

A further advantage of the present invention is that the welded design significantly reduces the base distortion caused by the old bolted construction. The bolted assembly left a gap between the base and the cylinder wall where the diaphragm terminated. This gap was adjacent the bolts holding the base to the cylinder wall, and even if these bolts were properly torqued, the gap caused distortion of the base. Furthermore, because bolt torquing is no longer necessary, assembly time and thereby cost is further reduced.

Because the present invention provides a welded seal at the diaphgram between the base and the cylinder wall, the potential for fluid leakage at the diaphragm, which existed in the old bolted design, is practically eliminated.

The self-centering column of the present invention provides additional advantages and further cost reductions. The self-centering column eliminates the need for a staying mechanism on the scale platform due to the magnitude of allowable, repeated side movement and the recentering force. Eliminating the staying mechanism represents an additional cost savings; also, accuracy of the load cell is improved because there is no connection between the load cell piston and the ground, as is necessary with a staying mechanism.

The self-centering column allows for a greater radius in a given load cell than the old ball coupling devices of the prior art. Therefore, the indentation of the bearing surfaces under loads is reduced. The geometry of the column provides a recentering force that did not occur with the ball mounted between flat bearing surfaces. With respect to concave bearing surfaces, the column of the present invention is an improvement in that a larger bearing surface is possible and the cost and difficulty of machining the concave surface is eliminated.

DETAILED DESCRIPTION OF THE PREFERRED EMBODIMENT

Figure 1:
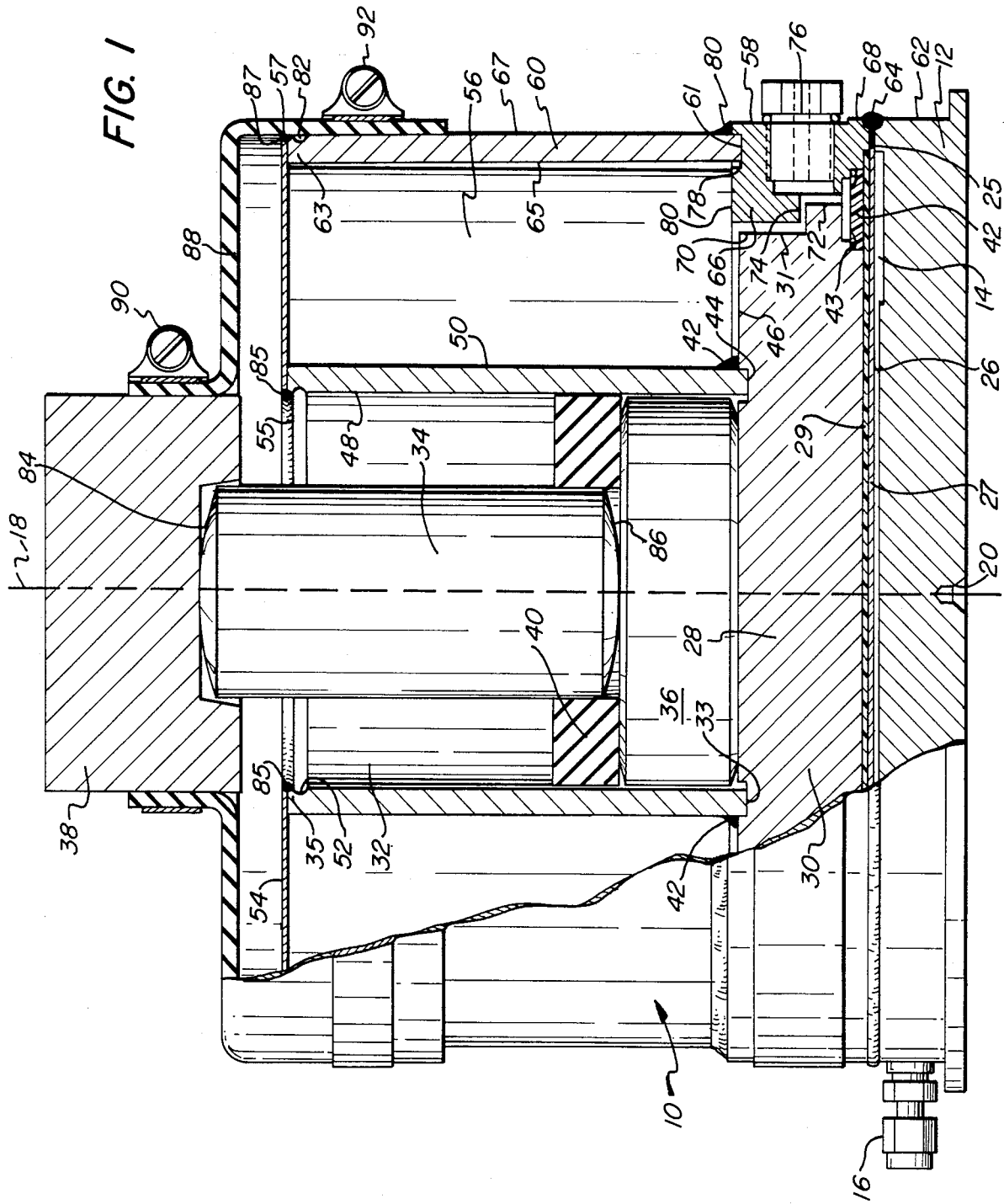
FIG. 1 is a side view with cutaway showing a partial cross section of the hydraulic load cell of the present invention.
Figure 2:
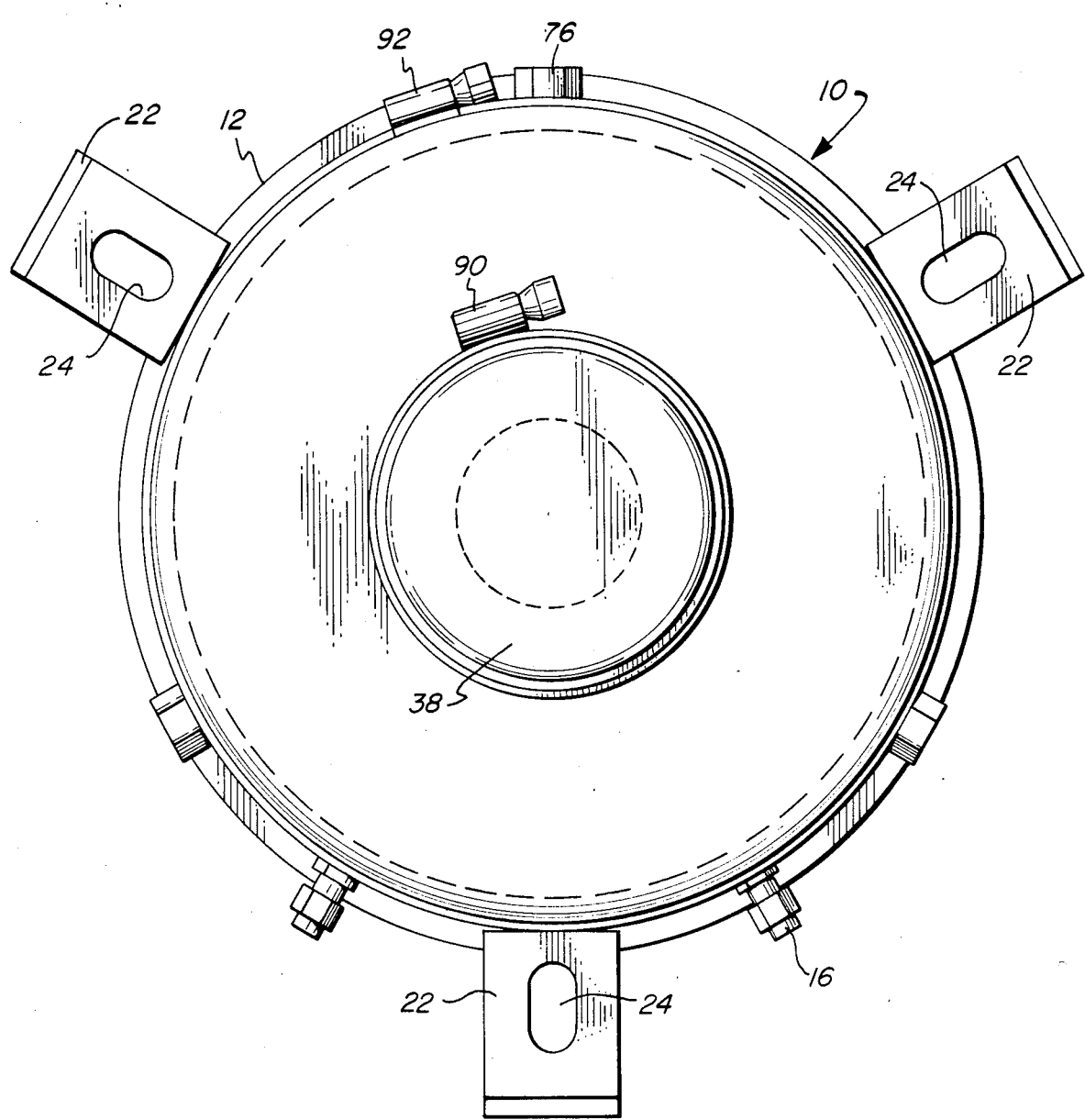
FIG. 2 is a top view of the hydraulic load cell shown in FIG. 1.

FIG. 1 shows a partial side view of the hydraulic load cell of the present invention indicated generally as 10. FIG. 2 shows a top view of the same load cell 10. By reference to FIG. 2, it is seen that the preferred cross-section of the present invention is circular, although other configurations, such as for example square or rectangular, could also be used.

Referring now to FIG. 1, cell 10 comprises a base 12 having a cavity or pressure chamber 14 therein for containing a fluid. Chamber 14 can be any means for forming a pressure chamber in the base and can be a depression of circular cross section or other substantially uniform cross section. The configuration of pressure chamber 14 shown in FIG. 1 is by way of illustration only. Chamber 14 communicates with a pressure sensitive transducer or indicator (not shown) through pressure transmitting coupling 16.

The base 12 is shown in FIG. 2 as being substantially circular in cross sectional area, although other well known configurations could be used. Base 12 defines a cell axis indicated by the dotted line 18, which extends substantially perpendicular to and through the center of the circular cross section of base 12. Cell axis 18 defines the center line with which the additional main elements of the cell as described below are substantially coaxial.

The preferred material for base 12 is stainless or carbon steel although other suitable materials such as, for example, monel, could be used as well. Base 12 has a hole 20 formed therein during the process of machining. Hole 20 has no function in the operation of the hydraulic load cell 10, but does lie substantially along cell axis 18. Mounting brackets 22 in FIG. 2 are provided with holes 24 for mounting base 12 and therefore cell 10 onto a mounting surface.

A diaphragm 26 or other sealing means overlies and is aligned with chamber 14 for providing a seal. Diaphragm 26 is a relatively thin flexible member 27 that comprises stainless steel, but could also be any resilient, fluid impervious material suitable for providing a seal, such as, for example carbon steel or monel. Flexible member 27 extends outwardly so that its outer periphery is aligned with the base 12 and is fused to the base 12 as part of the welding operation to be described below. In this embodiment, diaphragm 26 further comprises a neoprene disc 29 for absorbing shear forces that would otherwise exist due to the sliding motions between the piston and the diaphragm when subjected to a loading force. Disc 29 is not coextensive with the outer periphery of flexible member 27; rather, disc 29 fits into a recess so that its outer perimeter is smaller than that of the member 27, the neoprene disc thereby being sufficiently removed from the welding operation to be undamaged by the heat.

A piston, indicated generally as 28, overlies diaphragm 26. The piston comprises a bottom piston member 30 welded to a top piston member 32. Column 34 is positioned on a hardened block 36, which is positioned upon bottom piston member 30. Loading block 38 rests upon the column 34 and receives the loading force from the load (not shown). Both the loading block 38 and the hardened block 36 are formed of through hardened material, such as for example L7, to provide surfaces that resist indentation. A neoprene rubber stabilizing member 40, which can be of any suitably resilient material, positions the column centrally within the top piston member 32. As shown in FIG. 1, bottom piston member 30, top piston member 32, column 34, hardened block 36, loading 38, and stabilizing member 40 are all substantially coaxial with base 12 along cell axis 18.

Piston 28 comprises a bottom piston member 30 positioned adjacent to and in alignment with the pressure chamber 14. Bottom member 30 abuts diaphragm 26 and is substantially coextensive therewith in that the perimeter 31 of bottom member 30 extends adjacent to the perimeter 25 of the diaphragm 26, although a bridge ring 42 overlies part of diaphragm 26 and positions the bottom member 30 with respect to the cylinder walls. Bottom member 30 is preferably a stainless or carbon steel fly-cut plate, although other suitable materials, such as for example monel, could be used. As seen in FIGS. 1 and 2, bottom member 30 is of substantially circular cross section and is substantially coaxial with cell axis 18.

Bottom piston member 30 has a side face 70 comprising a gauging shoulder 72, which interacts with a projection shoulder 74 on a ring 58 to be more fully described below. The vertical distance between the gauging shoulder 72 and the projection shoulder 74 is indicative of the fluid level in pressure chamber 14, and this vertical distance can be measured by inserting a feeler gauge through gauging hole 76 formed in ring 58.

Top piston member 32 in FIG. 1 comprises a section of tubing, or piston tube. The tube 32 has a length predetermined by the size of the load cell, and the length of tube 32 is defined by first and second ends 33 and 35. Top piston member 32 abuts and joins the bottom piston member 30 at the first end 33, or bottom end as shown in FIG. 1, and is attached thereto by a continuous fillet weld 42 placed completely around an outer wall 50 or periphery of tube 32. It is understood that weld 42 could also be placed around the inside periphery of tube 32, although this would be more difficult to weld. As shown in FIG. 1, bottom piston member 30 has a groove 44 cut into its upper face 46 to receive the first end 33 of tube 32. Tube 32 comprises stainless or carbon steel, although other suitable material such as monel could be used, and is a section of a substantially uniform cylindrical body with circular cross section having a substantially uniform hollow portion extending the length of the body. Tube 32 has an inner wall 48 and an outer wall 50 defining a thickness predetermined by the magnitude of the loads to be encountered. As can be seen from FIG. 1, tube 32 is substantially aligned or coaxial with cell axis 18. Top piston member or tube 32 also has a groove 52 cut into its inner wall adjacent to the top or second end 35. This groove 52 extends around the entire inner wall 48 and provides a means for enabling a piston stabilizing means or stay plate 54 to be welded thereto, as will be described more fully below. Simple butt welding could also be used.

Although FIGS. 1 and 2 show that cylindrical or round tubing is used, it is also understood that it is possible to use other tubing such as square or rectangular for example, if a square or rectangular load cell is to be built.

The cylinder 56 for encasing the piston 28 comprises a ring 58 and a cylinder casing member 60. The cylinder casing member 60 is welded to the ring 58, which is then welded to the base 12, to form a cylinder for containing piston 28.

The ring 58 is aligned with the outer periphery of the diaphragm 26 and the outer periphery 62 of base 12 and is joined thereto by a butt weld 64 placed continuously around the periphery of the ring 58 and the base 12. The ring 58 comprises stainless steel, carbon steel, or other suitable material such as monel, and has a substantially circular cross section along its length coaxial with the cell axis 18. Ring 58 has an inner face 66 and an outer face 68. Inner face 66 forms the projection shoulder 74 as described above, and gauging hole 76 extends from the outer face 68 through to the inner face 66 in alignment with the vertical space between the gauging shoulder 72 and the projection shoulder 74. The inner face 66 of ring 58 is spaced a relatively small predetermined distance from the side face 70 of the bottom piston member 30, so as to permit vertical movement of the piston 28 in cylinder 56. Annular bridge ring 42 spaces the piston 28 from the ring 58. Bridge ring wires 43 and 45 provide pivot surfaces for the bridge ring about the bottom member 30 and ring 58. Outer face 68 of ring 58 is substantially aligned with the outer periphery of base 12.

Cylinder casing member 60 is joined to ring 58, which forms a groove 78 in its top face 80 to receive casing member 60. Member 60 comprises a stainless or carbon steel tube 60 having a length defined by first and second ends 61 and 63, the length being predetermined so that second end 63 is positioned for joining to the top piston member 32, as described more fully below. Monel or other suitable material can also be used. In FIG. 1, cylinder casing member 60 is substantially equivalent in length to top piston member 32, although other relative lengths are possible depending upon the configuration of the stay plate 54. Cylinder casing member 60 is of substantially cylindrical cross section along its length and is positioned to be substantially coaxial with cell axis 18. As with the piston tube, square, rectangular, or other tubing could also be used. Tube 60 has a diameter larger than that of piston tube 32, so that tube 32 can fit therein. The cylinder tube 60 is of a predetermined thickness, suitable for supporting the loads to be measured, which thickness is defined by an inner wall 65 and outer wall 67. The first or bottom end 61 of cylinder tube 60 abuts the ring 58 as described above and is joined thereto by a continuous fillet weld 80 around the outer wall 67 of cylinder tube 60. Fillet weld 80 could also be inside tube 60.

Cylinder tube 60 forms a groove 82 in its outer wall 67 adjacent to the second end 63, the groove 82 comprising means for enabling the welding of the piston stabilizing means or stay plate 54 to the second end 63 of the cylinder tube 60.

The stay plate, or piston stabilizing means 54, is a relatively thin, flexible annular member having an inner perimeter 55 and an outer perimeter 57. This stay plate 54 is for retaining the piston 28 inside the cylinder 56 and maintaining the proper spacing between the piston and the cylinder. Stay plate 54 abuts the piston tube 32 along its inner perimeter 55 and is joined to the piston tube 32 at the second end 35 adjacent the groove 52 by a butt weld 85 that extends continuously around the stay plate inner perimeter 55. Because no welding rod, or other mother metal, is used in the preferred welding process, groove 52 provides a small, relatively narrow strip of material comprising tube 32, e.g., stainless or carbon steel, for fusing tube 32 to stay plate 54. Stay plate 54 typically comprises the material stainless steel, although carbon steel or monel could also be used. Because of the annular shape of stay plate 54, piston tube 32 remains open at second end 35 for receiving the column 34, further described below. The stay plate 54 also abuts and is joined along its outer perimeter 57 to tube 60 at the second end 63 thereof by a second continuous butt weld 87 around the outer perimeter 57. Groove 82 serves the same welding enabling function as groove 52. Because stay plate 54 is flexible, piston 28 is thereby mounted inside cylinder 56 for movement therein with respect thereto.

Column 34 is a self-centering column for receiving the loading force from the loading block 38 and transmitting the loading force to the piston 28, or more specifically in FIG. 1, to the bottom piston member 30 through hardened block 36. Hardened block 36 minimizes indentation from the curved end of column 34 and thereby reduces friction and wear. The self centering column described herein is useful not only for hydraulic load cells, but for a variety of cells, including for example, strain gauges. An annular resilient ring 40, which may comprise neoprene rubber or other suitably resilient material, positions column 34 within piston tube 32 so that column 34 is substantially coaxial with cell axis 18. Column 34 can be any elongated member, substantially symmetrical about its longitudinal axis, that is suitable for transmitting the loading force to the piston 28. The column 34 is positioned by resilient ring 40 on the piston, or in FIG. 1 on the hardened block 36, so that the column's longitudinal axis is substantially aligned with the center axis 18 of the cell.

The column or elongated member has first and second convex bearing surfaces 84 and 86 for receiving and transmitting the loading forces, respectively. The first bearing surface 84 is symmetrical about the column's longitudinal axis, which in FIG. 1 is coincident with cell axis 18, and is defined by a symmetrical portion of a convex surface which can be a sphere, an ellipsoid, or other suitable symmetrical curved surface. Because the first bearing surface 84 is symmetrical about the longitudinal axis of the column, the center of the convex surface and therefore the center or focus of the first bearing surface 84 lies along the longitudinal axis. The second bearing surface 86 is likewise a portion of a convex surface having a center lying along the longitudinal axis.

The two centers or focii of the first and second bearing surfaces 84 and 86 do not coincide, and the center of surface 34 is below the center of surface 86. Or, stated another way, the radii are greater than one half the length of the column. Therefore, when column 34 is subjected to loads or forces that displace the top of the column 34 laterally so that the longitudinal axis is at some angle of displacement to the cell axis 18, there is a righting moment that causes self-centering of loading block 38 and vertical alignment of column 34, such that the longitudinal axis returns to substantial coincidence with the piston or cell axis 18 when the side load is removed.

The first and second bearing surfaces 84 and 86 can take a number of different configurations and dimensions. In one configuration, both radii of the first and second bearing surfaces 84 and 86 are greater than one half the length of the elongated member as measured along the longitudinal axis, where the radii of the first and second bearing surfaces are the respective distances along the longitudinal axis from the respective geometric center of the bearing surface to the bearing surface itself.

Figure 3:
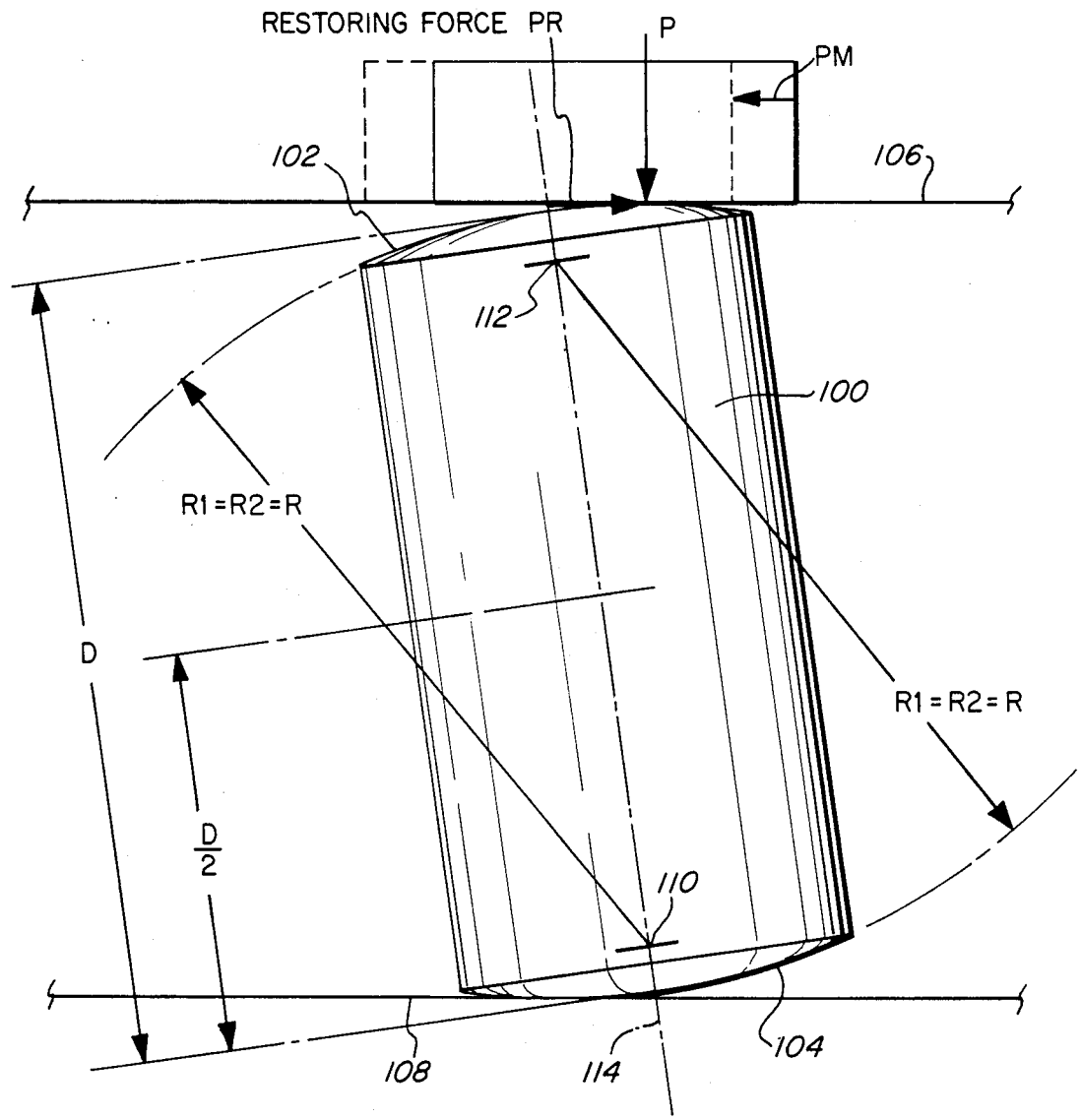
FIG. 3 is a cross sectional view of the self-centering column of the present invention.

The self-centering column of the present invention is shown in FIG. 3. FIG. 3 shows a cross section of a column 100 with a first convex bearing surface 102 and a second convex bearing surface 104. First and second bearing surfaces 102 and 104 are portions of the surfaces of two spheres, and the radii R1 and R2 of surfaces 102 and 104 are equal and lie along longitudinal axis 114, although their geometric centers or focii 110 and 112 do not coincide. The loading head is represented as surface 106 and hardened block 36 is represented as 108. It is understood that the column 100 of FIG. 3 is three dimensional and that column 100 is a rod or other elongated member having first and second bearing surfaces, each symmetrical about the longitudinal axis of the elongated member. The discussion of FIG. 3 assumes that the load cell axis is vertical or normal to the earth's surface, although other orientations are also possible.

The different parameters that characterize a column, such as the one shown in FIG. 3, comprise the following: P, which is the load on the load cell in a vertical direction; PR, which is the restoring force in a horizontal direction when the column 100 has been displaced laterally; PM, the magnitude of platform or loading head motion that causes the column 100 to be displaced laterally; and D, which is the length of the column along the longitudinal axis from the first bearing surface 102 to the second bearing surface 104. The radius R of the curved bearing surfaces, both radii being equal and R being greater than D/2, is then given by the following expression:

$$R = \frac{D/2}{\left(1 - \cos\frac{360PM}{2\pi D}\right) + \sin\frac{360PM}{2\pi D}\left[\frac{\tan\left(90 - \frac{360PM}{2\pi D}\right) - PR/P}{1 + \frac{PR}{P}\tan\left(90 - \frac{360PM}{2\pi D}\right)}\right]}$$

For example, if PR is 11% of P, D is four inches, and PM is 0.5 inches, then R is 3.77 inches as determined from the above expression.

It has been found that it is particularly desirable to have a column head where the restoring force PR is within the range of approximately 5% to 25% of the load cell load P. The length of the column, or D, must vary with the load rating of the load cell, with D increasing as the load rating increases. The platform motion PM also varies as required by the particular application, which determines the clearance between the platform attached to the loading head and the ground or other adjacent fixed surface.

Similar or equal recentering forces can be provided by curved surfaces on the ends of the column that are not equal radii as calculated by the above expression. These surface shapes could be unequal radii, or curves of changing radii, which would provide a variable rate of change of recentering force to suit a specific requirement. Another embodiment is a convex surface where the forming radii are symmetrically about, and not necessarily on, the longitudinal axis of the column.

A boot 88 comprising a flexible, resilient material such as neoprene rubber, is clamped around the load head 38 and also around the outer wall 67 of cylinder tube 60 by means of clamps 90 and 92, thereby sealing the cell against moisture, dirt, and other contaminants.

A preferred method of making the hydraulic load cell of the present invention comprises the following steps, which can be more clearly understood by referring to FIG. 1 above. A first section of cylindrical, or round, tubing 32 open at both ends is welded to a plate 30 also having a substantially circular cross section along its length, so that a first end of tubing 32 abuts the plate 30 and is substantially coaxial therewith. A welding jig may be particularly useful for completing this and other welding steps described below. A continuous fillet weld 42 is particularly preferred, although other welds could also be used, such as, for example, a butt weld. It is also preferred to use the metal of the tubing and of the plate itself as the source of the welding metal, although a source of welding material such as a welding rod could also be used.

The next step is to weld a second section of tubing 60, similar to the first except that the diameter of the second section 60 is chosen to be larger, to a ring 58 having an inner face 66 and an outer face 68 and being substantially circular in cross section along its length. The second section of tubing 60 is placed so that it is substantially coaxial with the ring 58 and abuts the ring 58. A continuous fillet weld 80 around the outer periphery of the second section 60 fuses the tubing to the ring. The ring has a predetermined size and shape such that the inner face 66 of the ring is adjacent to the face 70 of the plate.

Next, the first tubular section 32 having the plate 30 welded thereto is positioned inside and substantially coaxial with the second tubular section 60, which has been welded to the ring 58. The inner face 66 of the ring is positioned adjacent to the face 70 of the plate 30 and the upper end of the first tubular section 32 is aligned with the upper end of the second tubular section 60.

A relatively thin, flexible annular member 54 having an inner and an outer perimeter 55 and 57 is welded to the first and second tubular sections 32 and 60 by welding the inner perimeter 55 to the first tubular section 32 and the outer perimeter 57 to the second tubular section 60.

The bridge ring wires 43 and 45 are then inserted and the bridge ring 42 is placed on top of the wires. A neoprene disc and a diaphragm are placed in position above the assembled parts. A base 12 having means forming a pressure chamber 14 therein is welded to the diaphragm and to the ring 58 around the periphery of the ring 58, and the assembly is completed.

The above steps can also be carried out in other sequences that lead to equivalent results.

One preferred alteration to the above method comprises the steps of tack welding the first section of tubing to the plate by making approximately eight tacks equally spaced around the circumference of the plate, before continuously welding the tubing to the plate. Likewise, the second section of tubing can be first tack welded to the ring before continuously welding the tubing to the ring. It is also advantageous to tack weld the annular member 54 around its outer perimeter to cylinder tube 60 and the ring member 58 to the base 12 before continuously welding the parts together. It is also advantageous to heat the annular member while welding it to the first and second sections of tubing.

It is understood that, although the above description of the preferred embodiment has disclosed welding the various components of the load cell together, the present invention also contemplates the use of other well known methods for bonding or fusing, such as, for example, soldering or brazing. Also, in the above description, welding was achieved by melting portions of the members to be joined, so that they fuse together without the addition of other material, such as from a welding rod. However, this invention contemplates the fusion of the parts of the cells, either with or without the use of additional material. Various types of welds well known to those of skill in the art can also be used without departing from the spirit of this invention, including but not limited to butt welds, fillet welds, bevel welds, U-welds, and V-welds.

It should be understood that various changes and modifications of the preferred methods and embodiments described above will be apparent to those of skill in the art. Such changes and modifications can be made without departing from the spirit and scope of the present invention, and it is therefore intended that such changes and modifications be covered by the following claims.

We claim:

1. A hydraulic load cell for use in measuring a loading force, the cell comprising:
   (a) a base having means forming a chamber therein;
   (b) a diaphragm overlying said chamber in alignment therewith;
   (c) a piston overlying said diaphragm, said piston comprising:
      (i) a bottom piston member positioned adjacent to and aligned with the chamber, said bottom member abutting and substantially coextensive with the diaphragm; and
      (ii) a top piston member comprising a piston tube joining the bottom piston member at a first end of said piston tube by a continuous weld placed around the periphery of the piston tube;
   (d) a cylinder encasing the piston, the cylinder comprising:
      (i) a ring in alignment with and joined to the outer periphery of the base by a continuous weld placed around the periphery of the ring, whereby the chamber is sealed;

(ii) a cylinder casing member comprising a cylinder tube, said cylinder tube joining said ring at a first end of said cylinder tube by a continuous weld placed around the periphery of the cylinder tube;
(e) piston stabilizing means retaining said piston inside said cylinder and spacing said piston from said cylinder, said piston stabilizing means comprising a relatively thin, flexible member having an inner and an outer perimeter, said stabilizing member being joined along its inner perimeter to the piston tube along a second end thereof by a continuous weld placed around the inner perimeter of the stabilizing member, said stabilizing member also being joined along its outer perimeter to the cylinder tube along a second end thereof by a continuous weld placed around the perimeter of the annular member, whereby the piston is mounted inside the cylinder for movement therein with respect thereto in response to the loading force, whereby the continuous welds inhibit passage of moisture into said load cell; and
(f) a column having a first bearing surface for receiving the loading force and a second bearing surface for transmitting the loading force to the piston, the column being placed inside the piston tube and having a predetermined length sufficient to extend the first bearing surface through the open end of the top piston member, the column having a length D and the first and second bearing surfaces are portions of the surface of a sphere, each bearing surface having radii R1 and R2 associated therewith respectively, and R1=R2, where R1 and R2 given by $$R = \frac{D/2}{\left(1 - \cos\frac{360PM}{2\pi D}\right) + \sin\frac{360PM}{2\pi D} \left[\frac{\tan\left(90 - \frac{360PM}{2\pi D}\right) - PR/P}{1 + \frac{PR}{P}\tan\left(90 - \frac{360PM}{2\pi D}\right)}\right]}$$

where PM is the maximum allowable lateral displacement of the loading head and PR/P is the ratio of a lateral restoring force PR to the loading force P, whereby the loading force can be applied to the piston through the column.

2. A hydraulic load cell for use in measuring a loading force, the cell comprising:
   (a) a base having means forming a chamber therein;
   (b) a diaphragm overlying said chamber in alignment therewith, said diaphragm abutting said base around the periphery thereof;
   (c) a piston overlying said diaphragm, said piston comprising:
      (i) a bottom piston member positioned adjacent to and aligned with the chamber, said bottom member abutting and substantially coextensive with the diaphragm; and
      (ii) a top piston member comprising a piston tube joining the bottom piston member at a first end of said piston tube by a weld placed around the periphery of the piston tube;
   (d) a cylinder encasing the piston, the cylinder comprising
      (i) a ring in alignment with and joined to the outer periphery of the base by a weld placed around the periphery of the ring, the ring overlying and abutting said diaphragm whereby the diaphragm is sealingly retained at its periphery between said ring and said base to seal said chamber;
      (ii) a cylinder casing member comprising a cylinder tube, said cylinder tube joining said ring at a first end of said cylinder tube by a weld placed around the periphery of the cylinder tube;
   (e) piston stablizing means retaining said piston inside said cylinder and spacing said piston from said cylinder, said piston stabilizing means comprising a relatively thin, flexible member having an inner and an outer perimeter, said stabilizing member being joined along its inner perimeter to the piston tube along a second end thereof by a weld placed around the inner perimeter of the stabilizing member, said stabilizing member also being joined along its outer perimeter to the cylinder tube along a second end thereof by a weld placed around the perimeter of the annular member, whereby the piston is mounted inside the cylinder for movement therein with respect thereto in response to the loading force; and
   (f) a column having a first bearing surface for receiving the loading force and a second bearing surface for transmitting the loading force to the piston, the column being placed inside the piston tube and having a predetermined length sufficient to extend the first bearing surface through the open end of the top piston member, whereby the loading force can be applied to the piston through the column.

3. The hydraulic load cell of claim 2, wherein both the top piston member and the cylinder casing member each comprise a section of a substantially uniform cylindrical body having a substantially uniform hollow portion extending through the length of the body, the diameter of the cylindrical body comprising the top piston member being smaller than the diameter of the cylindrical body comprising the cylinder casing member.

4. The hydraulic load cell of claim 3, wherein the cylindrical bodies comprise means for enabling the welding of the piston stabilizing means thereto.

5. The hydraulic load cell of claim 4, wherein the cylindrical bodies each have inner and outer walls, and the top piston member comprises a groove around the perimeter of the inner wall adjacent the second end thereof, and the cylinder casing member comprises a groove around the outer wall adjacent the second end thereof, said grooves constituting means for enabling the piston stabilizing means to be welded to the top piston member and the cylinder casing member.

6. The hydraulic load cell of claim 3, wherein each weld is continuous, whereby the passage of moisture into the load cell is inhibited.

7. The hydraulic load cell of claim 6, where the top piston member and the cylinder casing member comprise stainless steel.

8. The hydraulic load cell of claim 6, where the top piston member and the cylinder casing member comprise carbon steel.

9. The hydraulic load cell of claim 6, wherein the weld joining the top piston member to the bottom piston member is a fillet weld, the weld joining the cylinder casing member to the ring is a fillet weld, both the welds joining the piston stabilizing means to the top piston member and the weld joining the piston stabilizing means to the cylinder casing member are butt welds, and the weld joining the base to the ring is a butt weld.

10. A hydraulic load cell for registering an indication of a loading force applied to the load cell, the load cell comprising:
(a) a base having means forming a pressure chamber therein, the base having a substantially circular cross sectional area and defining a cell axis extending substantially perpendicular to and through the center of the circular cross section area;
(b) a diaphragm aligned with and overlying the pressure chamber, said diaphragm abutting said base around the periphery thereof;
(c) a piston overlying said diaphragm, said piston comprising
  (i) a bottom piston member abutting the diaphragm, said bottom piston member having a substantially circular cross sectional area along its length and being substantially coaxial with the cell axis, the bottom piston member comprising stainless steel; and
  (ii) a top piston member comprising a stainless steel piston tube having a substantially uniform circular cross section along its length, the tube being substantially coaxial with the cell axis, the tube being of predetermined thickness defined by an inner wall and an outer wall, a lower end of the piston tube abutting the bottom piston member and joined to the bottom piston member by a continuous fillet weld around the outer wall of the piston tube;
(d) a cylinder supporting said piston therein for movement in a direction along the cell axis in response to the loading force, the cylinder comprising:
  (i) a ring comprising stainless steel, the ring being substantially circular in cross section along its length and being substantially coaxial with the cell axis, the ring having an inner face and an outer face, the inner face being adjacent to and spaced from the bottom piston member a predetermined distance for permitting motion of the bottom piston member with respect thereto, the outer face being substantially aligned with the outer periphery of the base, the ring being joined to the base by a continuous butt weld around the ring and the base adjacent to the outer face of the ring and the outer periphery of the base, the ring overlying and abutting said diaphragm, whereby the diaphragm is sealingly retained at its periphery between said ring and said base to seal said chamber;
  (ii) a cylinder casing member comprising a stainless steel cylinder tube having a substantially uniform circular cross section along it length, the cylinder tube being substantially coaxial with the cell axis, and being of predetermined thickness defined by an inner wall and an outer wall, a lower end of the cylinder tube abutting the cylinder ring and joined thereto by a continuous fillet weld around the outer wall of the cylinder tube;
(e) piston stabilizing means supporting said piston inside said cylinder and spacing said piston from said cylinder at an upper end of the piston tube and an upper end of the cylinder tube, said piston stabilizing means comprising a flexible annular member having an inner and an outer perimeter, said annular member abutting the upper end of the piston tube along the inner perimeter and being joined thereto by a continuous butt weld adjacent the inner perimeter and the inner wall of the top piston member, the piston tube forming a continuous groove around the inner wall adjacent the upper end thereof for enabling the piston stabilizing means to be welded to the piston tube, said annular member further abutting the upper end of the cylinder tube along the outer perimeter and being joined thereto by a continuous butt weld adjacent the outer perimeter and the outer wall of the cylinder tube, the cylinder tube forming a continuous groove around the outer wall adjacent the upper end thereof for enabling the piston stabilizing means to be welded to the cylinder casing member; and
(f) a column positioned inside the top piston member and having a first bearing surface for receiving the loading force and a second bearing surface for transmitting the loading force to the bottom piston member, the column being spaced from the inner wall of the top piston member, the first and second bearing surfaces being convex.

* * * * *